Patented Dec. 30, 1952

2,623,851

UNITED STATES PATENT OFFICE 2,623,851

AQUEOUS DRILLING MUD COMPOSITIONS

Richard A. Salathiel, Houston, Tex., assignor, by mesne assignments, to Standard Oil Development Company, Elizabeth, N. J., a corporation of Delaware No Drawing. Application January 19, 1951, Serial No. 206,929

4 Claims. (Cl. 252—8.5)

The present invention is directed to an aqueous suspension of finely divided solids and to a method of preparing an aqueous suspension of finely divided solids having a low filtration rate.

In many arts, dispersions or suspensions of finely divided solid material in an aqueous liquid vehicle are employed. Examples of such arts are the ceramic art, the cement treating art, and the drilling-mud treating art. In the employment of such dispersions or suspensions, experience has demonstrated that the loss of water by filtration therefrom may be excessive. As a matter of fact, the tendency to lose water by filtration may be so excessive as to prohibit the use of such suspensions or dispersions for some purposes. For example, the loss of water by filtration from a drilling mud may be so great as to impair seriously or even to destroy its usefulness in operations connected with the drilling of boreholes into subsurface formations. This invention, therefore, is concerned primarily with reducing the loss of water by filtration from dispersions or suspensions of finely divided solid materials in an aqueous liquid vehicle. It is particularly adapted to the treatment of aqueous suspensions or dispersions of finely divided solid materials used as a drilling fluid in the drilling of boreholes into subsurface formations by the rotary drilling method.

In the rotary method of drilling boreholes, an aqueous suspension of finely divided solids, commonly referred to as drilling mud, is pumped down the drill stem through the openings in the drill bit and upwardly through the annular space between the drill stem and the walls of the borehole to the surface of the earth. A primary purpose for employing the drilling mud is to pick up the cuttings produced by the drill bit and to transport these cuttings to the surface of the earth. The drilling mud also serves other important functions such as lubricating the bit and the drill stem, cooling the bit, and furnishing a hydrostatic pressure head to prevent flow into the borehole of formation fluid, such as oil, gas, and water, from the various strata penetrated by the drill bit. In certain cases it is highly desirable that the mud form a thin, difficultly permeable coating on the walls of the borehole for the purpose of reducing loss of water from the borehole to the formation and thereby reducing softening of the borehole walls and caving into the drill hole. It is preferable that the filter cake formed on the walls of the borehole be thin rather than thick so as to avoid mechanical difficulties in moving the bit in and out of the hole and in placing casings in the hole.

The aqueous suspensions of finely divided solids employed as a drilling fluid in rotary drilling operations are sometimes prepared by admixing a suitable amount of commercial clay with water. Heavy materials such as barytes, iron oxide, barium sulfate, calcium carbonate, silica, and the like are often added to such a suspension in order to increase its specific gravity. In many cases, however, the drilling fluid used in oil and gas wells is prepared in the process of drilling by dispersing in water the cuttings produced from the borehole. Weighting materials, clays, and chemicals may, of course, be added to the drilling fluid prepared in the last mentioned manner. The water employed may suitably be fresh water or salt water.

Almost any fluid will perform some of the aforementioned functions, such, for example, as cooling the drill bit, but to perform some of the other functions, it is necessary that the drilling fluid employed possess certain very definite properties. For example, a drilling mud may have sufficient gel strength to prevent settling of solids from the mud when circulation of the mud is stopped, but, at the same time, its other properties may be such as to result in the deposition of a thick filter cake on the borehole walls rather than the preferred thin cake. When large amounts of water filter from the mud into the formations surrounding the borehole, the solids content of the mud remains as a filter cake on the wall of the hole, reducing the size of the annular passage. Sloughing of such a thick filter cake may cause the drill pipe to become stuck. On the other hand, the employment of a drilling fluid having a low filtration rate restricts to a relatively small amount the water that can escape from the mud under the pressure differential prevailing in the borehole. A small loss of water from the mud to the formation means, of course, that only a thin filter cake will be deposited on the borehole walls. Use of the proper mud will help to preserve the borehole walls intact.

Occasionally, drilling muds which naturally have a relatively low filtration rate may be prepared from borehole cuttings; however, it generally has been found necessary to incorporate amendatory agents in the mud to impart this desirable property thereto. It is common practice to employ starches, starch derivatives, and water-soluble natural gums for reducing the filtration rates of aqueous drilling muds. These materials have been used extensively in salt water muds, which of themselves generally have high filtration rates and which are not ordinarily amenable to control by the usual dispersing-agent type of mud-treating agents such as salts of polyphosphoric acids and tannin-caustic soda mixtures, agents widely used in fresh water muds. Water soluble, etherically bonded substituent derivatives of cellulose, such as sodium carboxymethylcellulose and hydroxyethylcellulose, have also been suggested as organic colloid additives for the reduction of filtration rates of drilling muds. Although these materials reduce the loss of water from the drilling muds by filtration, they may themselves impart other undesirable properties thereto. For example, it is known that some of the aforementioned additives increase the viscosity of drilling muds undesirably. The starches are objectionable in that they ferment, thereby losing their effectiveness as filtration rate reducers.

It is, therefore, an object of the present invention to provide an aqueous dispersion or suspension of finely divided solid material having little tendency to lose water by filtration therefrom. Another object of the present invention is to provide a method for reducing the loss of water from an aqueous dispersion or suspension of finely divided solid material. Another object of the present invention is to provide a drilling fluid suitable for use in the rotary drilling of boreholes into subsurface formations and having a low filtration rate. Another object of the present invention is to provide an agent which, on addition to the aqueous-base drilling fluid used in the drilling of boreholes into subsurface formations, will substantially reduce the loss of water therefrom by filtration. A further object of the present invention is to provide an agent which, on addition to a drilling fluid, will substantially reduce the loss of water therefrom by filtration, but which will not increase excessively the viscosity of the fluid or substantially affect its ability to maintain solids in suspension.

The method of the present invention may be described briefly as involving the addition to or maintenance in a mixture, dispersion, or suspension of finely divided solid material in an aqueous liquid vehicle of a sufficient amount of a water soluble salt of sulfonated rubber to reduce the tendency of the mixture, dispersion, or suspension to lose water by filtration. By employing the proper quantity of any one of the class of the aforementioned salts or mixtures thereof, the water loss by filtration from the dispersion or suspension is reduced to a low value. For example, the water loss by filtration from a drilling mud may be maintained at a low value by maintaining a filtration-reducing amount of the aforementioned salts in the mud.

The composition of the present invention may be described briefly as a mixture comprising finely divided solid material, an aqueous vehicle in which the solid material is dispersed or suspended, and a sufficient amount of a water soluble salt of sulfonated rubber to reduce the loss of water from the mixture by filtration. The composition of my invention may consist of any dispersion or suspension of a finely divided solid, such as clay and/or weighting agents and the like, in an aqueous liquid vehicle, such as fresh water or salt water, and a water soluble salt of sulfonated rubber, one of the class of said salts or mixtures thereof being present in a sufficient quantity to reduce loss of water from the suspension or dispersion by filtration. The finely divided solid material of the composition of my invention may, of course, be any finely divided solid which is capable of being dispersed or suspended in an aqueous liquid vehicle, and an example of such a dispersion or suspension is the drilling fluid used in rotary drilling of boreholes, which may include various solid materials as hereinbefore indicated.

The water soluble salts of sulfonated rubber which are employed in accordance with my invention in the aforementioned method and composition are prepared by first sulfonating natural rubber and then neutralizing the sulfonated rubber with a suitable solution to convert the sulfonated rubber to a water soluble salt. Preferably, an alkali metal hydroxide or an ammonium hydroxide solution is employed.

The amount of soluble salts of sulfonated rubber or mixtures thereof required to give the desired reduction in loss of water by filtration from a suspension of finely divided solids in an aqueous liquid vehicle will vary with circumstances over a reasonably wide range, and the amount employed in a specific suspension or dispersion will depend upon these circumstances and the characteristics of the material treated. Experience has shown, however, that between 0.05 weight per cent and 2.0 weight per cent of these salts, based on the weight of the suspension or dispersion, will ordinarily give satisfactory results. In some instances even less than 0.05 weight per cent gives favorable results, although ordinarily less reduction in filtration rate is obtained when smaller amounts than this are employed. In some instances it may be desirable to add more than 2.0 weight per cent of the salt to a suspension, although amounts in excess of 2.0 weight per cent ordinarily give little additional reduction in filtration rate. When employed in accordance with this invention, the aforementioned salts may be added directly to the dispersion or suspension in the form of a dry powder or they may be first dissolved in a suitable solvent, such as water, and the solution added to the suspension or dispersion in the proper amount to give the desired concentration of the salt therein.

As a specific example of the practice of the present invention, it may be desirable to employ a water solution of the salts of the present invention. This water solution may then be incorporated with the aqueous dispersion or suspension of finely divided solids. When, for example, it is desired to reduce the filtration rate of a drilling mud, the aforementioned water solution may be incorporated with the mud at a suitable point in the mud circulation system, such as in the mud ditch. It may be desirable to use a mixing device such as a cone and jet mixer, or the equivalent thereof, for incorporating the water solution with the drilling mud. On the other hand, the salts of the present invention may be incorporated in the aqueous dispersion or suspension in the form of a dry powder or as a slurry suspended in a suitable liquid. The aforementioned powder or slurry may be incorporated with a drilling mud at any suitable point in the mud circulation system.

Several methods of preparing the water soluble salts of sulfonated rubber have been reported in the literature. All of these methods involve subjecting the rubber molecule to the action of a sulfonating agent. Various methods for the preparation of sulfonated rubbers are given in German Patent No. 582,565.

In the examples given herein, chlorosulfonic acid in ether solution has been employed in the preparation of the sulfonated rubber samples. This ether solution of chlorosulfonic acid was admixed with an ether solution of rubber and the mixture allowed to react for a sufficient time to form a sulfonated rubber product. It was found that the character of the sulfonation product produced depended upon a number of variables and a study was made to determine the effect of these variables.

A study of the variables involved in the sulfonation reaction showed that the most effective products, from the standpoint of filtration reduction, were prepared by using only a moderate excess of sulfonating agent and keeping reaction time to a minimum. When excessively large quantities of chlorosulfonic acid were used and when the reaction was allowed to proceed for long periods of time, the resulting product was of low molecular weight and, consequently, of low effectiveness. This study indicated that the contact time selected and the amount of sulfonating agent employed should be such as to convert most of the rubber to the water soluble sulfonate. More specifically, it was found that desirable products are obtained when a moderate molar excess of chlorosulfonic acid is employed and the reaction is allowed to proceed at room temperature (about 75° F.) for as little as about 5 minutes and for no more than about one hour and a half.

The following example will illustrate the procedure which may be employed in preparing a water soluble salt of sulfonated rubber for use in accordance with the present invention.

Example

A solution of 28 parts of crude rubber (No. 1 smoked ribbed sheet) in 660 parts of dry ether was treated with a solution of 175 parts of chlorosulfonic acid and 140 parts of dry ether. A rubbery mass had completed its separation from solution within 3 minutes and adhered in part to the stirrer blade. About 8 minutes after addition of the reagent solution the supernatent solvent was poured off. Water was added and the product dissolved in it with stirring. The solution was neutralized by adding 34 parts of caustic soda dissolved in water. The organic solvent was removed and the product solution concentrated somewhat by heating on a water bath and passing a stream of air over the solution while stirring. The resulting aqueous solution of 1.98% concentration (based on rubber taken for reaction) had a viscosity at 25° C. of about 170 centipoises.

Difficulties in preparing sulfonated rubber by the method described in the foregoing example are largely difficulties of physical handling of the materials. A large part of the sulfonated rubber separates from the reaction solution almost immediately upon addition of the reagent solution. Furthermore, insufficient contact with the reagent solution may leave part of the rubber not sulfonated and therefore not water soluble. The usual difficulty is that the sulfonated rubber separates from solution almost immediately upon addition of the reagent and soon forms a compact ball on the stirrer so that further contact with the reagent in solution becomes impossible. When this condition exists an appreciable amount of the separated material may be found not to be adequately sulfonated and not water soluble. The problem is to get adequate contact with the reagent so as to attain sulfonation of essentially all the rubber and so to render it water soluble without using excessively long contact times which would degrade the molecular weight of the product. Perhaps the best solution to this problem is to add the sulfonating reagent solution all at once while stirring the rubber solution vigorously and stopping the stirring very quickly thereafter. The sulfonated rubber thereby separates in a spongy form in good contact with the reagent solution. A few minutes contact under such conditions will convert nearly all the rubber to a water soluble product. Using this technique, as in the foregoing example, the yield of pure sodium salt of sulfonated rubber was found to be 2.44 times the weight of rubber reacted. This value indicates that about 97% of the isoprene units of the long chain rubber molecule contained sodium sulfonate substituent groups.

The salt of sulfonated rubber prepared according to the above example was added to each of several muds and the resulting muds tested along with samples of each of the muds without the additive so that the effects of the additions could be known. Results of the tests are shown in Table I below:

Table I

| Stock Mud Used | Sulfonated Rubber Added, Wt. Percent | 600 R. P. M. Stormer Viscosity, Centipoises | A. P. I. Filtration Rate, cc. in 30 Minutes |
|---|---|---|---|
| Fresh-water mud a | 0.000 | 10 | 11.2 |
| Do | 0.244 | 28 | 6.2 |
| Sea-water mud b | 0.000 | 15 | 33.4 |
| Do | 0.122 | 20 | 20.9 |
| 5% Salt-water mud c | 0.000 | 29 | 31.0 |
| Do | 0.122 | 35 | 20.4 |
| 12% Salt-water mud d | 0.000 | 48 | 41.6 |
| Do | 0.122 | 55 | 27.2 |
| 16% Salt-water mud e | 0.000 | 29 | 60.5 |
| Do | 0.122 | 45 | 36.7 | a 18.0% *Xact clay and 1.6% ***Aquagel clay dispersed in 80.4% of tap water.
b 24% **Baroco clay dispersed in 76% of synthetic sea water.
c 26% **Baroco clay dispersed in 74% of 5% salt solution.
d 31% **Baroco clay dispersed in 69% of 12% salt solution.
e 25% **Baroco clay dispersed in 75% of 16% salt solution.

*Xact—a surface clay mined in Texas.
**Baroco—a surface clay mined in Texas.
***Aquagel—Wyoming bentonite.

The data in Table I show that very small quantities of water soluble salts of sulfonated rubber substantially reduced the filtration rate of the drilling mud to which added while increasing viscosity only moderately. Furthermore, these data show that these salts are effective in both fresh water mud and in salt water muds.

To further demonstrate the effectiveness of water soluble salts of sulfonated rubber, even when used in small quantities, various amounts of the salt prepared in the hereinbefore described manner were added to a fresh water mud and to a 5% salt water mud. The viscosity, gel strength, and filtration rate of each of these examples were then determined. The data obtained are shown in Table II below:

Table II

| *Sodium Salt of Sulfonated Rubber Added, Wt. Percent | Viscosity at 600 R. P. M. Stormer, cps. | Gel Strength, gms. Stormer | | Filtration Rate, cc. in 30 Min. A. P. I. |
|---|---|---|---|---|
| | | Initial | 3 Minute | |
| (a) .000 | 9 | 0 | 4 | 11.0 |
| .061 | 14 | 0 | 7 | 8.0 |
| .122 | 18 | 0 | 9 | 6.8 |
| .244 | 28 | 1 | 11 | 5.7 |
| .488 | 50 | 5 | 13 | 4.9 |
| (b) | 31 | 34 | 46 | 28.1 |
| .061 | 33 | 33 | 46 | 22.8 |
| .122 | 34 | 32 | 45 | 18.3 |
| .244 | 41 | 30 | 44 | 14.2 |
| .488 | 52 | 25 | 39 | 9.7 |

(a) Mud: 18.0% Xact clay, 1.6% **Aquagel clay, 80.4% tap water.
(b) Mud composed of 26% ***Baroco clay and 74% of 5% salt solution.

*Added as a 4.84% aqueous solution.
**Xact clay—a surface clay mined in Texas.
***Baroco clay—a surface clay mined in Texas.
****Aquagel—Wyoming bentonite.

The data in Table II show that marked filtration reduction in both the fresh water and salt water mud is obtained by adding as little as 0.061% of the water soluble salt to the mud. Larger reductions in filtration rate are, of course, obtained by increasing the concentration of water soluble salt in the mud. These data further show that neither gel strength nor viscosity is excessively affected by the addition of as much as 0.49% of the water soluble salt to the mud.

While in the examples heretofore given, the sodium salt of sulfonated rubber has been employed, it will be understood that any water soluble salt of sulfonated rubber may be employed in accordance with the present invention.

The nature and objects of the present invention having been fully described and illustrated, what I wish to claim as new and novel and to secure by Letters Patent is:

1. In a method of drilling and controlling a well drilled into subsurface formations by the rotary drilling method in which an aqueous drilling mud is circulated into the well, the method of forming a filter cake on the wall of the well to decrease loss of aqueous fluid from the drilling mud which comprises admixing with said drilling mud a filtration reducing amount of a water soluble inorganic salt of sulfonated rubber, and contacting the wall of the said well with the resulting drilling mud.

2. A method in accordance with claim 1 in which the water soluble salt is present in an amount in the range of 0.05 weight per cent and 2.0 weight per cent of the mixture.

3. A drilling mud comprising a major amount of a suspension including finely divided solid inorganic material in an aqueous liquid vehicle and a minor amount of a water soluble inorganic salt of sulfonated rubber, the said minor amount being in the range of 0.05 weight per cent and 2.0 weight per cent of the suspension.

4. A drilling mud in accordance with claim 3 in which the water soluble inorganic salt is the sodium salt.

RICHARD A. SALATHIEL.

REFERENCES CITED

The following references are of record in the file of this patent:

FOREIGN PATENTS

| Number | Country | Date |
|---|---|---|
| 582,565 | Germany | Nov. 18, 1930 |
| 608,922 | Great Britain | Sept. 22, 1948 |